(12) United States Patent
LeBlanc et al.

(10) Patent No.: US 8,869,917 B2
(45) Date of Patent: Oct. 28, 2014

(54) HOUSING, MANDREL AND BEARING ASSEMBLY FOR DOWNHOLE DRILLING MOTOR

(75) Inventors: Randall C. LeBlanc, Lafayette, LA (US); Carl S. LeBlanc, Lafayette, LA (US)

(73) Assignee: Coiled Tubing Rental Tools, Inc., Lafayette, LA (US)

(*) Notice: Subject to any disclaimer, the term of this patent is extended or adjusted under 35 U.S.C. 154(b) by 741 days.

(21) Appl. No.: 13/166,080

(22) Filed: Jun. 22, 2011

(65) Prior Publication Data

US 2012/0325561 A1 Dec. 27, 2012

(51) Int. Cl.
*E21B 4/02* (2006.01)
*F16C 19/30* (2006.01)
*E21B 4/00* (2006.01)

(52) U.S. Cl.
CPC . *E21B 4/02* (2013.01); *F16C 19/30* (2013.01); *F16C 2352/00* (2013.01); *E21B 4/003* (2013.01)
USPC .............................. 175/207; 175/228; 384/94

(58) Field of Classification Search
USPC .......................... 175/207, 228; 384/93, 94, 97
See application file for complete search history.

(56) References Cited

U.S. PATENT DOCUMENTS

| 771,626 A | 10/1904 | Gilman |
|---|---|---|
| 3,840,080 A | 10/1974 | Berryman |
| 3,986,570 A | 10/1976 | Stinson et al. |
| 4,246,976 A | 1/1981 | McDonald, Jr. |
| 4,368,789 A | 1/1983 | Orr et al. |
| 4,492,276 A | 1/1985 | Kamp |
| 4,772,246 A | 9/1988 | Wenzel |
| 5,000,723 A | 3/1991 | Livingstone |
| 5,090,497 A | 2/1992 | Beimgraben et al. |
| 5,205,789 A | 4/1993 | Falgout, Sr. |
| 5,267,905 A | 12/1993 | Wenzel et al. |
| 5,495,900 A | 3/1996 | Falgout, Sr. |
| 5,547,229 A | 8/1996 | Eidsmore |
| 5,588,818 A | 12/1996 | Houmand et al. |

(Continued)

FOREIGN PATENT DOCUMENTS

| CA | 2058080 | 11/1997 |
|---|---|---|
| DE | 40 32 064 A1 | 4/1992 |

(Continued)

OTHER PUBLICATIONS

Authorized Officer Philippe Bécamel, International Preliminary Report on Patentability, PCT/US2012/037976, mailed Jan. 9, 2014, 12 pages.

(Continued)

*Primary Examiner* — William P Neuder
(74) *Attorney, Agent, or Firm* — Fish & Richardson P.C.

(57) ABSTRACT

A downhole housing, mandrel and bearing assembly 100 includes a flex shaft 20 adapted to connect to a downhole motor power output 309 and a tubular mandrel 30 adapted to connect to a drill bit 370. A lower tubular housing 60 is adapted to contain a lower bearing assembly 90 and catch sleeve assembly 110. The catch assembly 110 is adapted to retain the mandrel 30 in the lower housing if the mandrel breaks. An upper tubular housing 70 contains an upper bearing assembly 80 and is adapted to connect to a housing 302 of the downhole motor 301. A method of assembling the downhole housing, mandrel and bearing assembly 100 is disclosed.

21 Claims, 15 Drawing Sheets

(56) References Cited

U.S. PATENT DOCUMENTS

| | | |
|---|---|---|
| 5,651,737 A | 7/1997 | Le Blanc |
| 5,704,838 A | 1/1998 | Teale |
| 6,073,708 A | 6/2000 | Brown et al. |
| 6,116,658 A | 9/2000 | Bohlen |
| 6,183,226 B1 | 2/2001 | Wood et al. |
| 6,202,762 B1 | 3/2001 | Fehr et al. |
| 6,203,435 B1 | 3/2001 | Falgout, Sr. |
| 6,328,119 B1 | 12/2001 | Gillis et al. |
| 6,709,234 B2 | 3/2004 | Gilbert et al. |
| 6,827,160 B2 * | 12/2004 | Blair et al. .................. 175/107 |
| 6,860,514 B2 | 3/2005 | Wentworth et al. |
| 6,905,319 B2 | 6/2005 | Guo |
| 6,945,338 B1 | 9/2005 | Defourny et al. |
| 6,949,025 B1 | 9/2005 | Kraus et al. |
| 7,004,843 B1 | 2/2006 | Kerstetter |
| 7,186,182 B2 | 3/2007 | Wenzel et al. |
| 7,549,487 B2 | 6/2009 | LeBlanc et al. |
| 7,624,819 B1 | 12/2009 | LeBlanc et al. |
| 2002/0092682 A1 | 7/2002 | Blair et al. |
| 2003/0181245 A1 | 9/2003 | Shaw |
| 2005/0072602 A1 | 4/2005 | Pascale et al. |
| 2008/0029304 A1 | 2/2008 | LeBlanc et al. |
| 2008/0135304 A1 | 6/2008 | Duggan et al. |

FOREIGN PATENT DOCUMENTS

| | | |
|---|---|---|
| DE | 195 27 990 C1 | 8/1996 |
| DE | 200 12 524 U1 | 9/2000 |
| DE | 10 2006 022613 B4 | 11/2007 |
| GB | 2 354 300 | 3/2001 |
| JP | H05-141172 | 6/1993 |

OTHER PUBLICATIONS

Authorized officer Adri Schouten, International Search Report and Written Opinion of the International Searching Authority, PCT/US2012/037976, mailed Sep. 9, 2013, 16 pages.

Authorized officer Jean-Marie Bouvet, Communication Relating to the Results of the Partial International Search in International Application No. PCT/US2012/037976, mailed May 17, 2013, 4 pages.

Authorized officer Nathalie Kermani, International Search Report/Written Opinion in PCT/US2009/052445, mailed Feb. 25, 2010, 13 pages.

Authorized officer Yannick Gouby, International Search Report/Written Opinion in PCT/US2009/054065, mailed Nov. 11, 2010, 13 pages.

Authorized officer Simin Baharlou, International Preliminary Report on Patentability in PCT/US2009/054065, mailed Mar. 3, 2011, 7 pages.

* cited by examiner

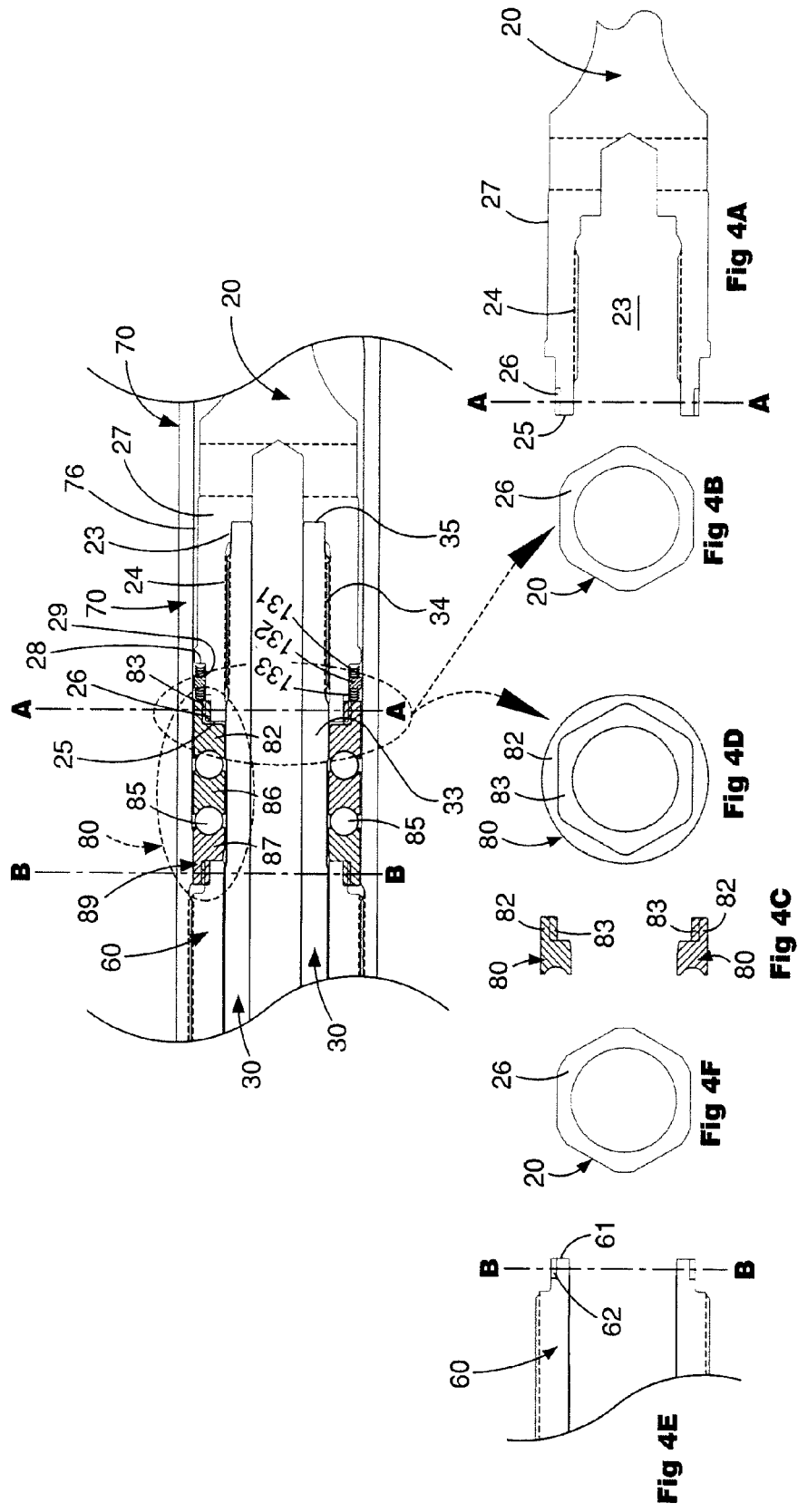

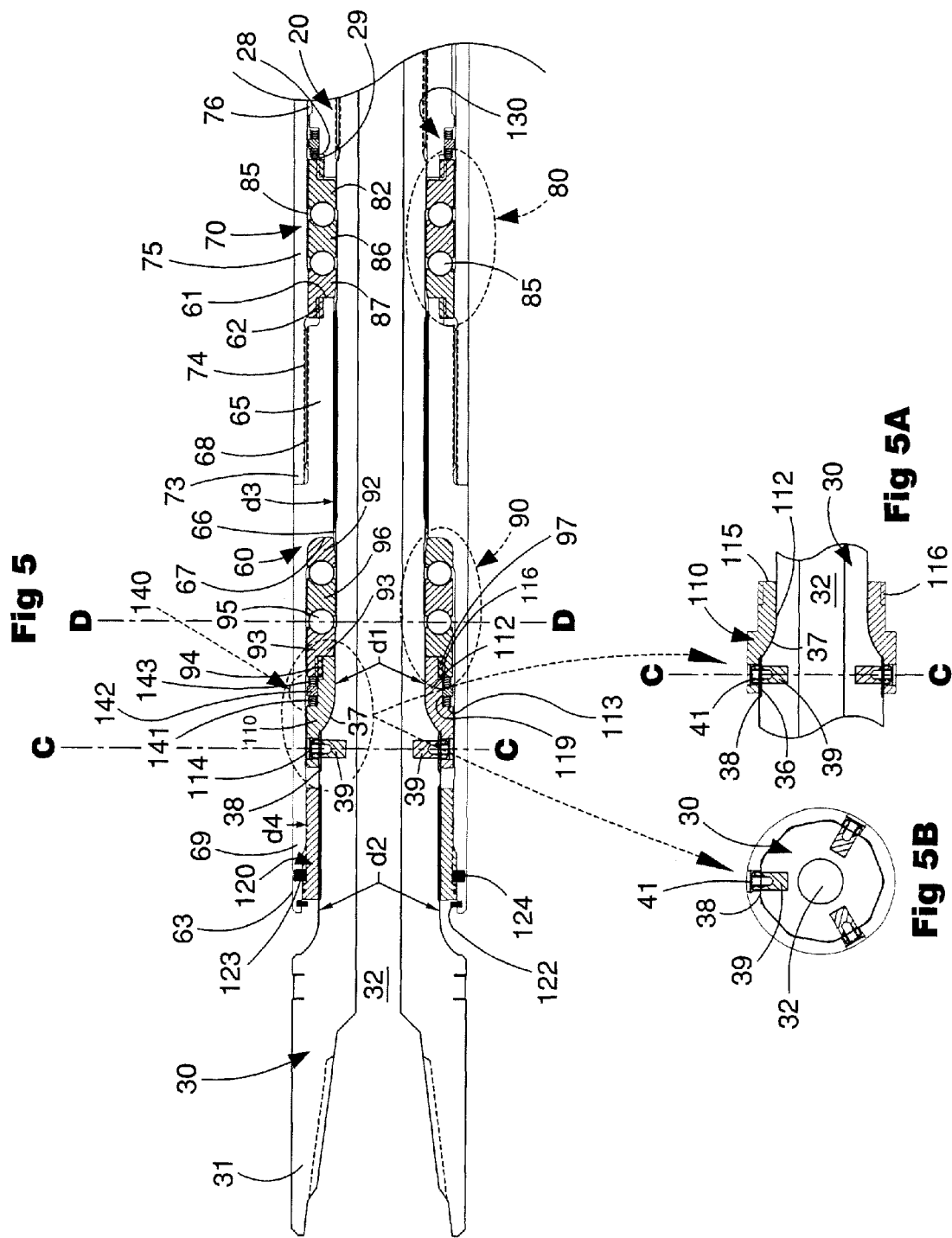

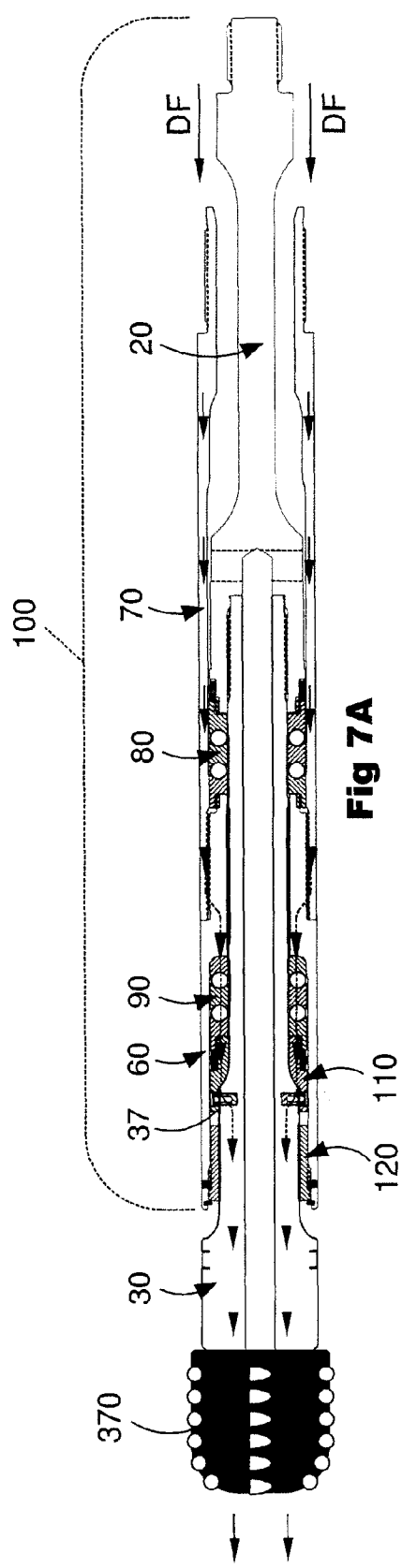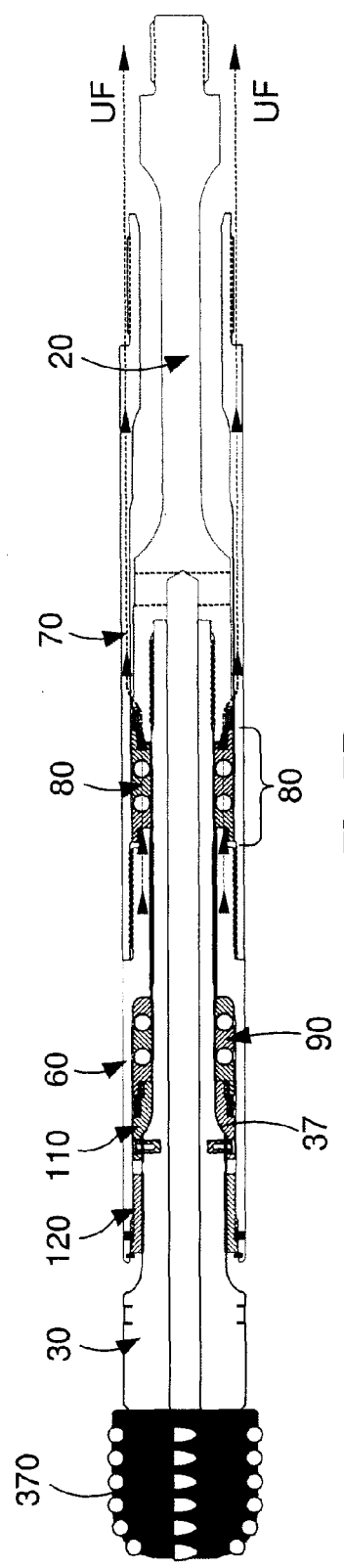

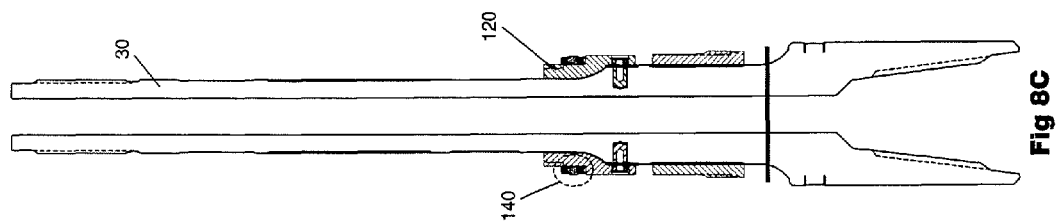
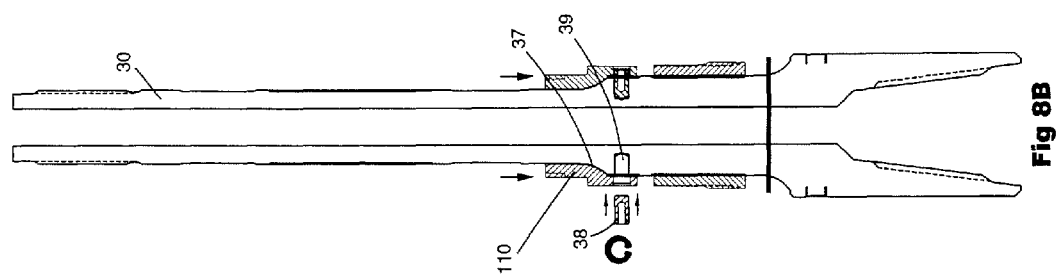
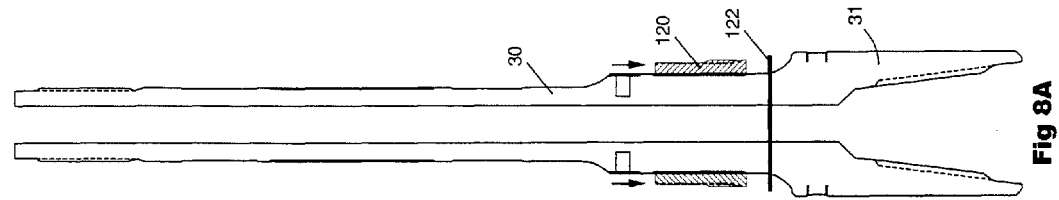

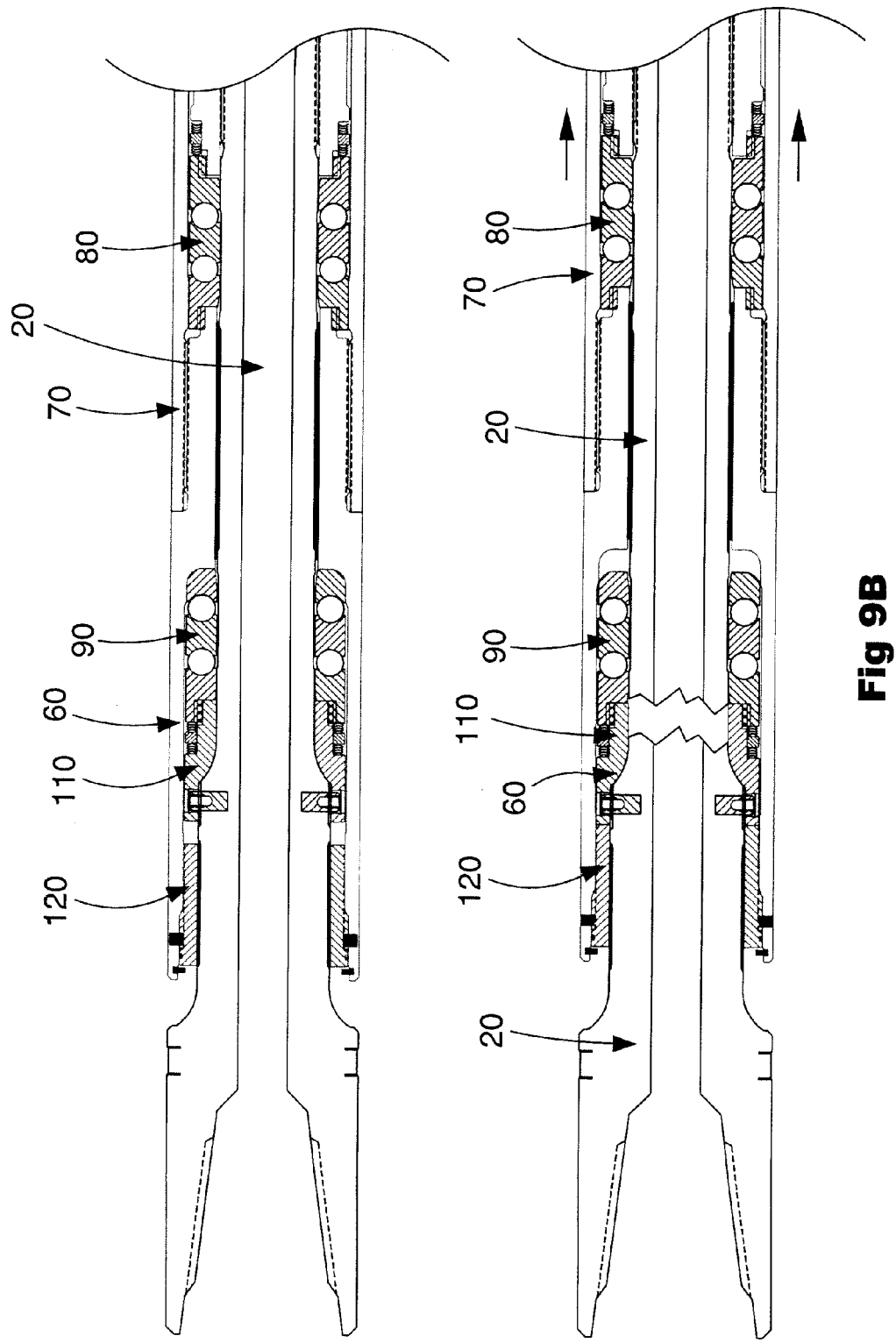

HOUSING, MANDREL AND BEARING ASSEMBLY FOR DOWNHOLE DRILLING MOTOR

TECHNICAL FIELD

The present invention relates generally to improvements in downhole drilling equipment and more particularly pertains to a new improved housing, mandrel and bearing assembly for transmitting power from a downhole drilling motor output to a drill bit.

BACKGROUND

Downhole drilling motors have been used for many years in the drilling of oil and gas wells and other wells. In the usual mode of operation, the rotational power output shaft of the motor and the drill bit will rotate with respect to the housing of the motor. The housing, in turn, is connected to a conventional drill string composed of drill collars and sections of drill pipe. This drill string extends to the surface. Drilling fluid is pumped down through the drill string to the bottom of the hole and back up the annulus between the drill string and the wall of the bore hole. The drilling fluid cools the drill bit and removes the cuttings resulting from the drilling operation. In the instances where the downhole drilling motor is a hydraulic powered type, such as a positive displacement type motor, the drilling fluid also supplies the hydraulic power to operate the motor. See FIG. 1.

Virtually all downhole drilling motors have three basic components:
1. Motor section
2. Vertical thrust bearings
3. Radial bearings The bearings can be placed in a separate package or unit at the motor section and thus can be used on any type of motor (i.e., turbodrills, positive displacement motors, etc.).

There are two basic types of downhole drilling motors:
1. Turbodrills
2. Positive displacement motors.

Turbodrills utilize the momentum change of drilling fluid (i.e., mud) passing through curved turbine blades to provide power to turn the bit. Turbodrills turn at speeds of 600 to 3,000 rpm. Positive displacement motors have fixed volumetric displacement and their speed is directly proportional to the flow rate of the hydraulic power fluid. There are two basic types of positive displacement motors in use:
1. Moineau motors have a helical rotor within the cavity of a stator which is connected to the housing of the motor. As the drilling fluid is pumped down through the motor, the fluid rotates the rotor.
2. Vane motors have large volumetric displacement and therefore deliver higher torques at lower speeds.

Thrust bearing failure in downhole motors is a problem because of high dynamic loads produced by the action of the bits and by drill string vibrations. One major oil company placed a recorder at the hole bottom and found that dynamic loads were often 50% higher than the applied bit weight. It was found on occasion that the bit bounced off bottom and produced loads in excess of 120,000 pounds when drilling at an applied bit weight of 40,000 pounds. See discussion in U.S. Pat. No. 4,246,976, incorporated by reference. These high loads can cause rapid failure of the thrust bearings and bearing mandrels; consequently, these bearings must be greatly over-designed to operate in the hostile downhole environment.

At least two types of thrust bearings have been used in downhole drilling motors:
1. Rubber friction bearings
2. Ball or roller bearings.

Radial bearings are required between the bearing housing and the rotating mandrel transmitting power from the motor power output to the bit. Radial bearings are usually subjected to lower loads than the thrust bearings and therefore have much longer life. The basic types of radial bearings used in downhole motors are:
1. Marine bearings
2. Roller or ball bearings
3. Metal to metal carbide bearings.

Most motors contain metal to metal radial bearings. These bearings are frequently lubricated by circulating mud through them. However, some bearing systems are sealed and are lubricated using lubricant (grease) injected into the bearing by a hydraulic piston assembly.

For a further discussion of downhole drilling motors and their operations, see U.S. Pat. Nos. 3,840,080; 4,246,976; 4,492,276; 5,495,900; 5,090,497; 6,183,226; 6,905,319 and Canadian Patent No. 2,058,080, incorporated by reference.

SUMMARY

The present disclosure pertains to a new improved housing, mandrel and bearing assembly for transmitting power from a downhole drilling motor output to the drill bit. Rotational power=torque×RPM/5250. The invention provides a reduced length housing, bearing and mandrel assembly used in downhole drilling operations. Reduced length provides the following advantages:
1. Ability to more effectively navigate around deviated sections of the wellbore by reducing friction caused as a section of the bottom hole assembly goes in and out of these deviated sections which ultimately causes premature wear on internal components.
2. A reduced bit to bend allows the drill motor to build greater angle with less of an incorporated fix bend to get to desired lateral. This reduced degree bent housing ultimately reduces wear and tear on internal components.

As used in this document, "tubular" refers to a generally cylindrical member with a longitudinal passage therethrough. The longitudinal passage may be formed therein or bored therethrough.

A downhole housing, mandrel and bearing assembly 100 is disclosed herein. The assembly includes a flex shaft 20 having an upper end 21 with a threaded male pin adapted to connect to a helical rotor power output 309 and a lower end 25 having a male hex connector 26. The assembly further includes a tubular mandrel 30 adapted at a lower end 31 to connect to a drill bit, said mandrel having an upper portion 33 of the mandrel 30 adapted to connect to the lower portion 27 of the flex shaft 20 and a longitudinal passage 32 through the mandrel from an upper end 35 to the lower end 31. The assembly further includes a lower tubular housing 60 having a longitudinal passage 66 from an upper end 61 of the housing to a lower end 63 of the housing wherein the upper end 61 further has a male hex connector 62. The assembly includes an upper tubular housing 70 having a longitudinal passage 76 from an upper end 71 of the housing to a lower end 73 of the housing wherein the passage has a lower portion 74 with an internal diameter adapted to receive the upper bearing assembly 80 and the lower portion 74 of the internal passage is adapted to connect to the male upper portion of the lower tubular housing 60. An upper bearing assembly 80 is disposed in the internal passageway 76 of the upper housing 70. The bearing assembly includes an upper bearing race member 82 having an upper female hex box connector 83 adapted to receive the male hex connector 26 of the flex shaft 20. A center bearing race 86 is disposed below the upper race member 82 and separated by a plurality of thrust balls 85. A lower bearing race member 87 is disposed below the center bearing, the lower race member has a lower end that includes a lower female hex box connector 89 that secures the lower race member to the male hex connector 62 at the upper end 61 of the lower tubular housing 60. A plurality of thrust balls 85 are disposed between the middle race member 86 and the lower race member 87. A lower bearing assembly 90 is disposed in the internal passageway 66 of the lower housing 60, wherein the bearing assembly includes a generally cylindrical body with an upper end 92 adapted to be received in shoulder 67 of the lower housing 60. A middle bearing race member 96 is disposed below the upper bearing race member 92 and separated by a plurality of thrust balls 95. A lower bearing race member 93 is disposed below the middle race member 96. The lower race member has a lower end that includes a lower female hex box connector 94 that secures the lower race member to a male hex connector 116 at the upper end of the catch assembly 110. A plurality of thrust balls 85 are disposed between the middle race member 96 and the lower race member 93. The assembly further includes a catch sleeve 110 disposed on a lower portion of the tubular mandrel 30. The catch sleeve includes an internal passageway 112 adapted to contact the tubular mandrel wherein an exterior surface of the catch sleeve is adapted to be received in longitudinal passageway 66 of lower housing 60. An upper end 115 of the catch sleeve has an upper male hex connector 116 adapted to receive the female hex connector 94 of the lower bearing member 93. A lower portion of the internal passageway 112 of the catch sleeve has a hexagonal cross-section adapted to receive a hexagonal cross-section of a portion 36 of the tubular mandrel. A portion of the internal passageway is adapted to contact the shoulder 37 of the tubular mandrel. The assembly further includes at least two radial receptacles 39 disposed in the lower portion 36 of the tubular mandrel 30, each of the receptacles adapted to receive a locking pin 41 and secure the catch sleeve to the tubular mandrel 30. A snap ring holds the locking pin 41 in place. The assembly further includes a radial sleeve 120 disposed in the lower end 63 of the lower housing 60, locked within the lower housing by radial dowel pins 124 that secures the radial sleeve to the lower housing and in operation the mandrel rotates in the radial sleeve and the lower housing. The radial sleeve is held within the housing with the retaining ring 122. This retaining ring 122 serves to hold the radial sleeve within the housing and extract the lower mandrel in the event of a fracture within the upper section of the mandrel.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is an enlarged cross-section of an upper portion of the assembly of FIG. 3;

FIG. 4A is a cross-section illustrating a portion of a flex shaft of the assembly of FIG. 4;

FIG. 4B is a lateral cross-section of the flex shaft of FIG. 4A taken at section AA;

FIG. 4C is a cross-section of a bearing assembly member of FIG. 4;

FIG. 4D is a lateral cross-section of an upper end of the bearing assembly member of FIG. 4 taken at Section AA;

FIG. 4E is a cross-section of the upper end of the lower housing of FIG. 4;

FIG. 4F is a lateral cross-section of the upper end of the lower housing of FIG. 4 taken at section BB;

FIG. 5 is a cross-section of a lower portion of the assembly of FIG. 3;

FIG. 5A is a cross-section illustrating a portion of a tubular mandrel and a catch assembly of FIG. 5;

FIG. 5B is a lateral cross-section of the tubular mandrel and the catch assembly of FIG. 5A taken at section CC of FIG. 5;

FIGS. 7A and 7B are a cross-section illustrating the transfer of downward force and upward force from a drill string through the assembly of FIG. 3 to a drill bit;

FIGS. 8A to 8K are partial cross-sections illustrating the sequential steps of assembling the housing, mandrel and bearing assembly of FIG. 3; and FIGS. 9A and 9B are a cross-section illustrating the assembly of FIG. 3 before failure of the mandrel and after failure of the mandrel wherein the catch sleeve and radial sleeve maintain the broken mandrel in the assembly.

Like reference symbols in the various drawings indicate like elements.

DETAILED DESCRIPTION

Figure 1:
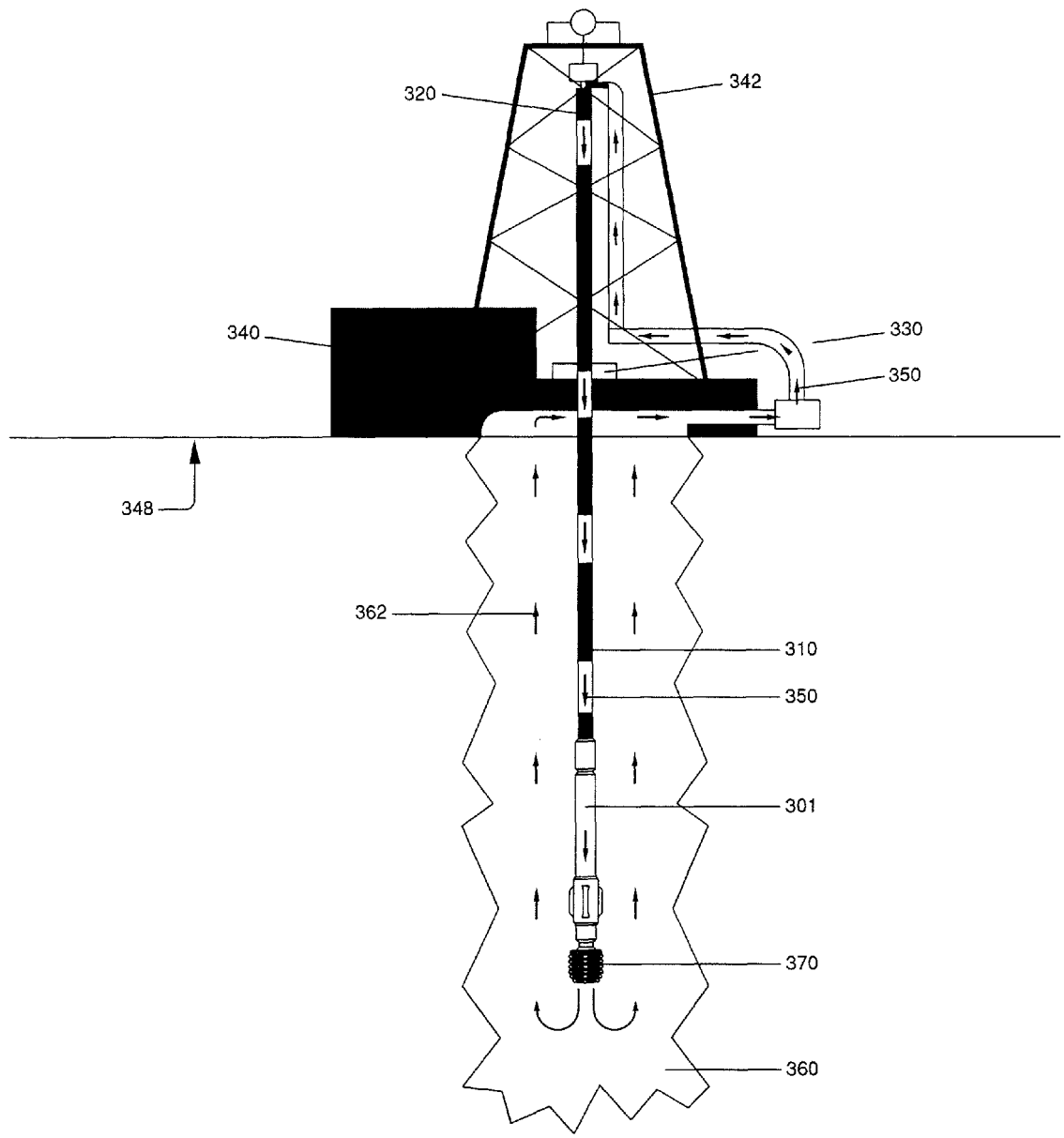
FIG. 1 is a schematic illustrating a typical drilling system using a downhole drilling motor assembly.

FIG. 1 illustrates a simplified schematic of a drilling operation. A drill string 310 extends to the surface 348 where it is connected to a kelly 320, mounted in a rotary table 330 of a drilling rig 340 to provide rotation to the drill string 310 when a downhole motor is not used to provide rotation to the bit. Alternatively, top drive systems are suspended in a rig derrick 342 and provide rotation directly to the drill string 310. Drilling fluid 350 is pumped down through the drill string 310 to the bottom of the bore hole 360 and back up the annulus 362 between the drill string 310 and the wall of the bore hole 360. The drilling fluid cools the drill bit 370 and removes the cuttings resulting from the drilling operation.

In certain drilling situations, including but not limited to directional drilling, it is useful to use a downhole drilling motor assembly 301 to provide rotation to the bit. In such situations the downhole motor assembly 301 is inserted into the drill string 310 above the drill bit 370. In the instances where the downhole drilling motor is a hydraulic type, such as a progressive cavity type motor, the drilling fluid 350 also supplies the hydraulic power to operate the motor.

Various types of downhole drilling motors may be employed for the purpose of the invention such as electrical motors and hydraulic motors. Suitable hydraulic motors are turbines, vane motors and Moineau motors. See discussion in background section of this document about various types of drilling motors.

A Moineau motor is very useful for application in the present invention since this type of motor is provided with a flexible connection between the rotor and power output shaft to compensate the eccentric movement of the rotor in the housing during operation of the motor. The invention is not restricted to the use of a Moineau motor. Any type of downhole motor known in the art may be used with the bearing mandrel and bearing assembly of the present invention.

Figures 2, 2A:
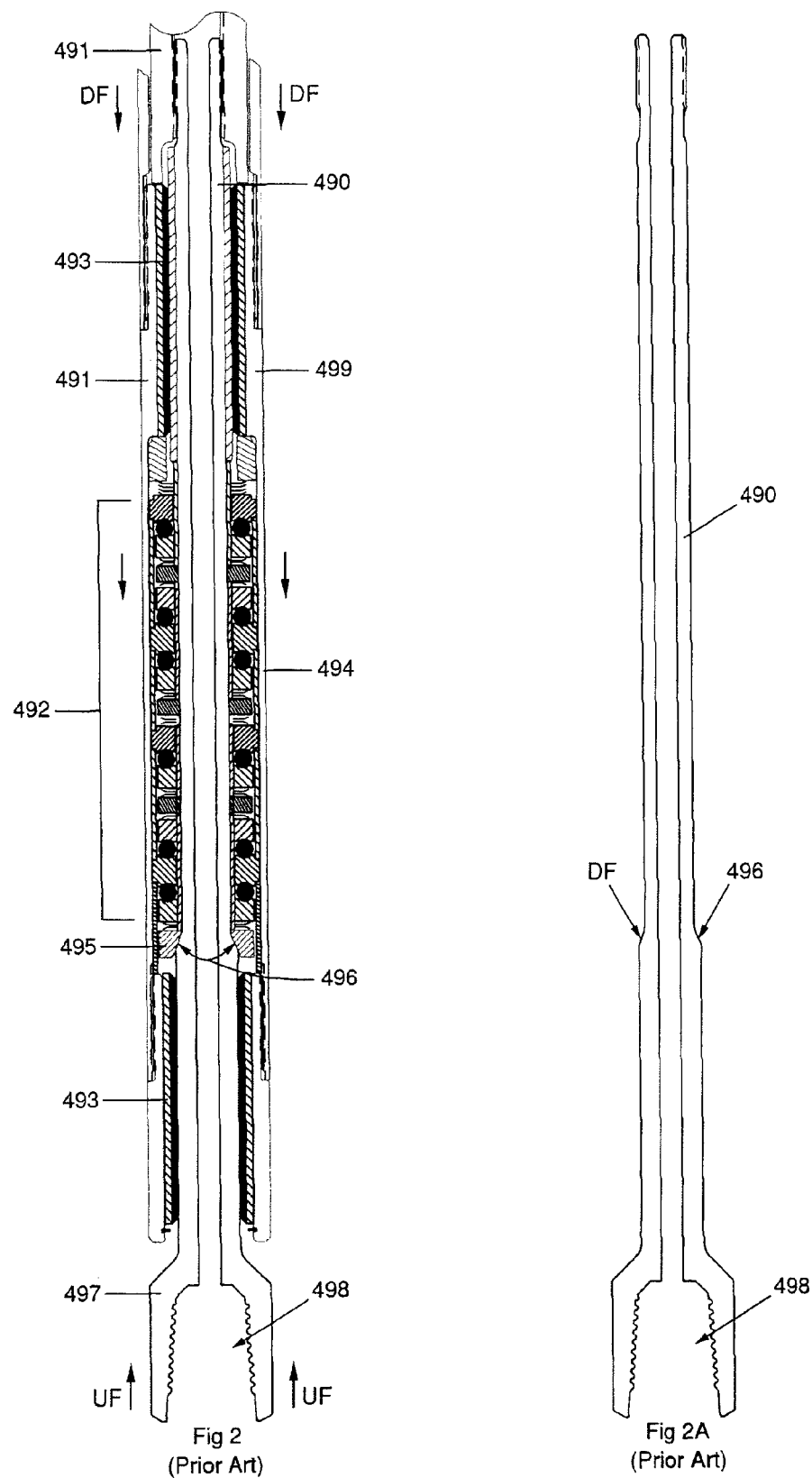
FIG. 2 is a cross-section of a prior art bearing and bearing mandrel assembly of a prior art downhole motor.
FIG. 2A is a cross-section of the bearing mandrel of the prior art assembly of FIG. 2.

FIG. 2 illustrates a partial cross-section of a prior art downhole motor bearing assembly and bearing mandrel assembly. A downhole drilling motor (not shown) transmits power from the motor power output 491 to a bearing mandrel 490 that contacts radial bearings 493 and thrust bearings 492 housed in a bearing housing 494. The mandrel's distal (lower) end 497 includes a bit box 498 connection for connection to a drill bit. The box connection results in assembly configurations that do not allow the mandrel to be assembled by insertion of the mandrel through the proximal (upper end) 499 of the bearing housing 494. These prior art configurations have mandrels with stepped down profiles 496 on which a bearing spacer 495 makes contact. FIG. 2A illustrates one embodiment of a cross-section of the prior art bearing mandrel 490.

As weight is applied on the bit, a downward force DF will move down the drill string through the motor and to the mandrel 490. As the mandrel 490 moves downward, bearing spacer 491 will push thrust bearings 492 down. Bearing spacer 495 will contact mandrel 490 at the step down 496. When it does, it will provide weight to the bit to start drilling. An equal and opposite upward force UF will be exerted by the bottom of the bore hole below the bit.

Figure 3:
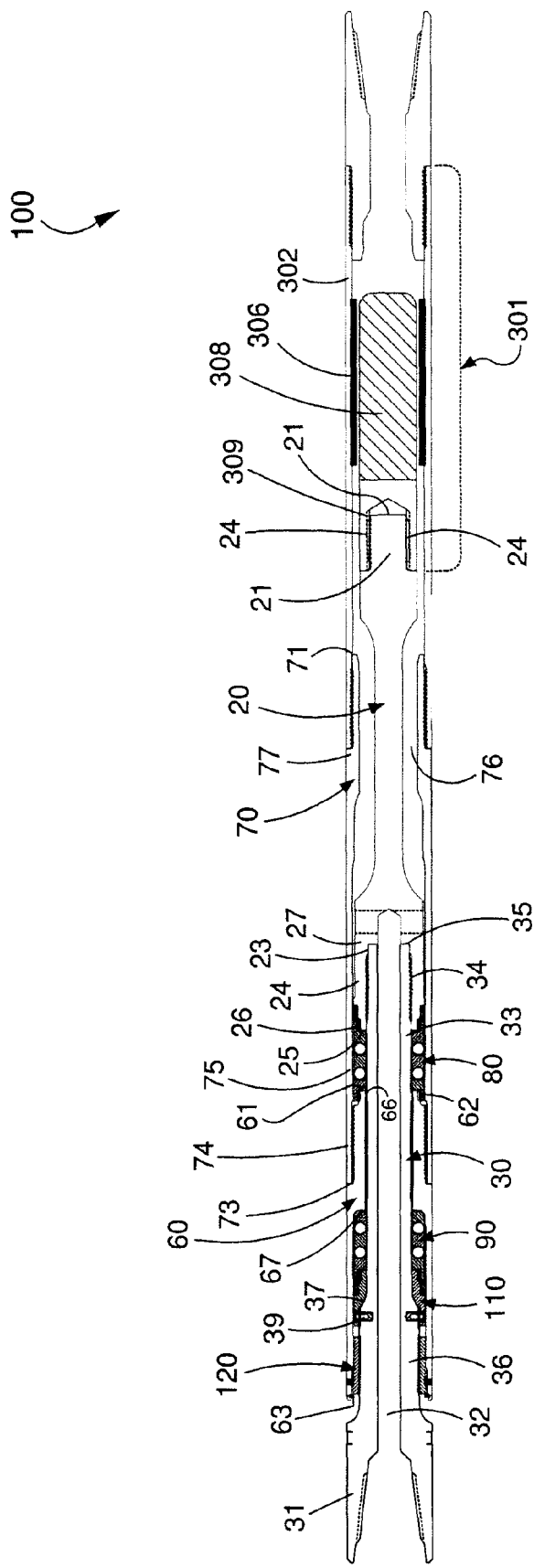
FIG. 3 is a cross-section of a housing, mandrel and bearing assembly of the present disclosure.
Figure 5D:
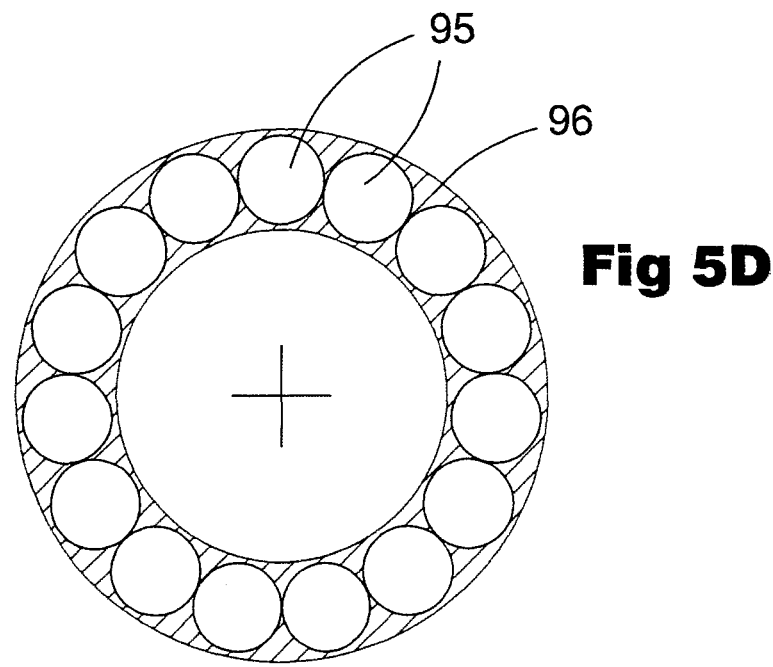
FIG. 5D is a lateral cross-section of the lower bearing assembly of FIG. 5 taken at section DD.
Figure 5C:
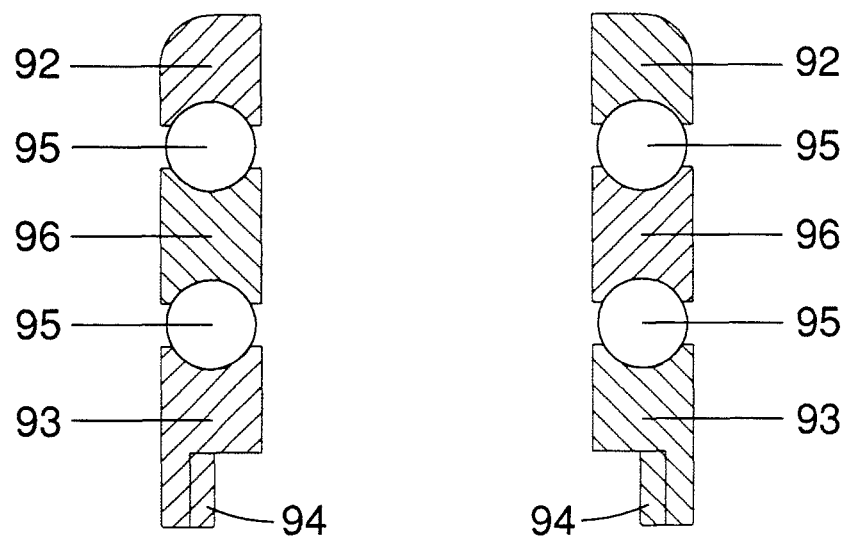
FIG. 5C is a cross-section of a lower bearing assembly of FIG. 5.

FIG. 3 illustrates a partial cross-section of a downhole motor assembly 301 that includes a tubular housing 302 that is preferably formed of steel. Disposed within the tubular housing 302 is a power unit having a stator 306 and a rotor 308 connected to a power output assembly 309. The power output assembly 309 may be attached directly to the housing, mandrel and bearing assembly 100 according to one embodiment of the present invention or may include intermediate assemblies that ultimately connect to the housing, mandrel and bearing assembly 100 of the present invention.

Figure 6:
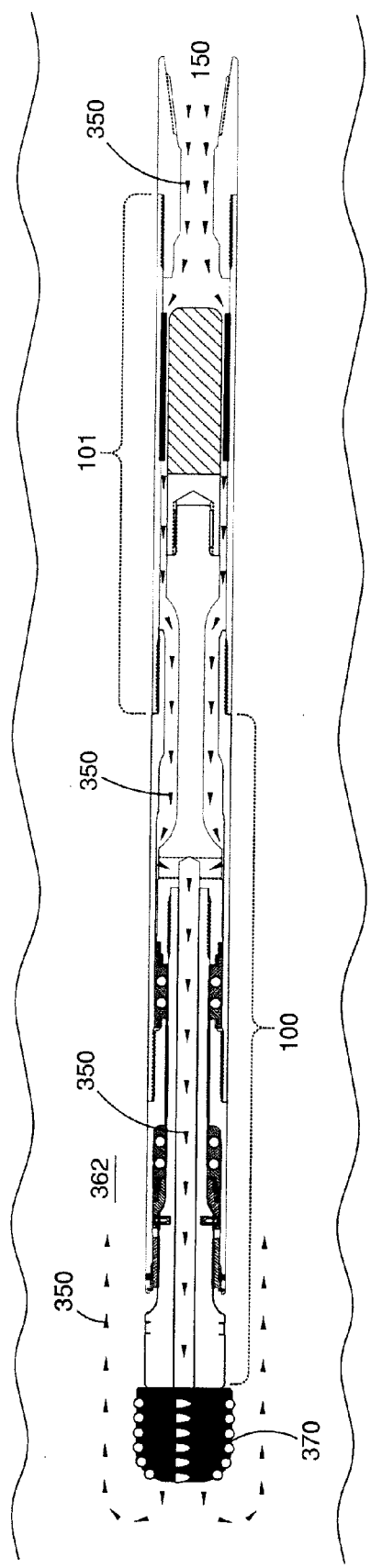
FIG. 6 is a cross-section illustrating the flow of drilling fluid down the drill string, through a downhole drilling motor, through the assembly of FIG. 3, out a bit and up the annulus of the wellbore.
Figure 8F:
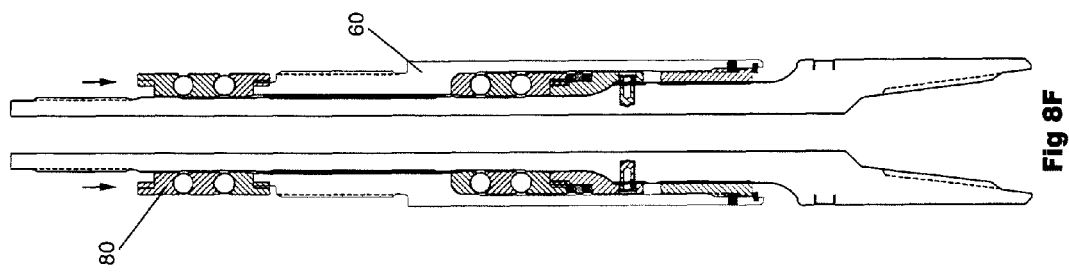
Figure 8E:
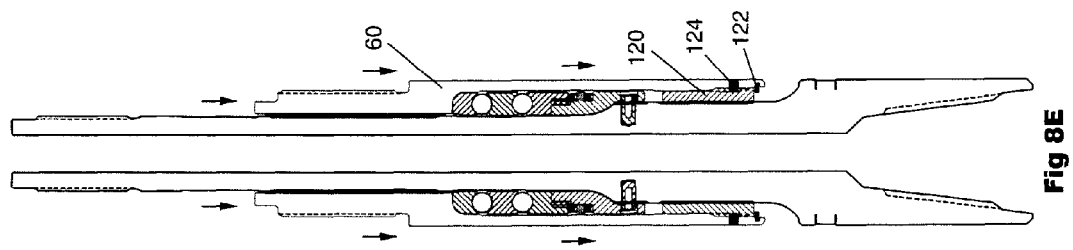
Figure 8D:
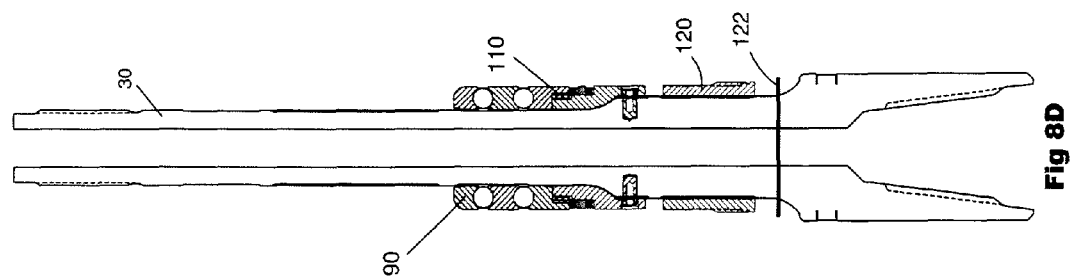
Figure 8G:
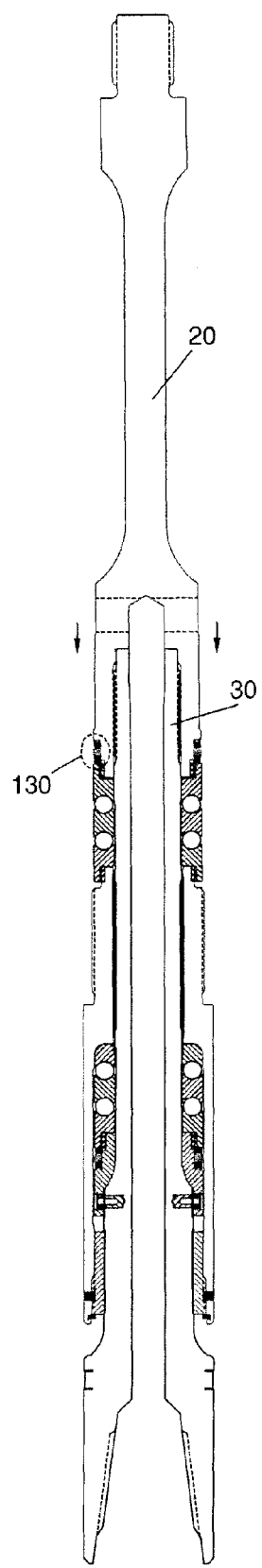
Figure 8H:
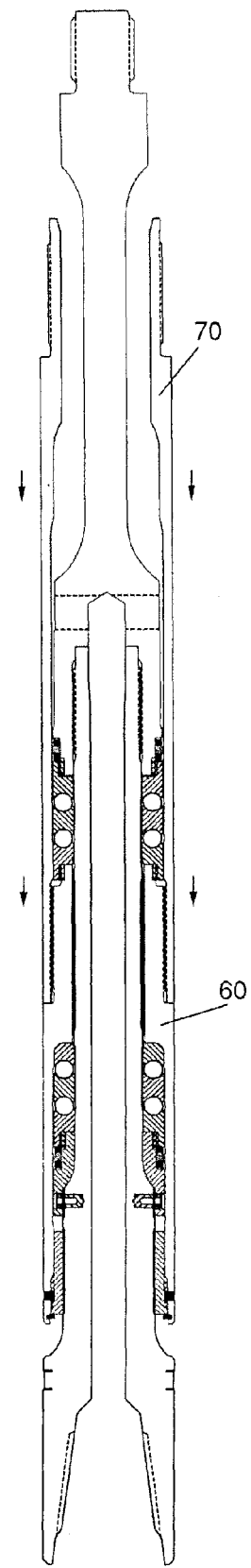
Figures 8I, 8J, 8K:
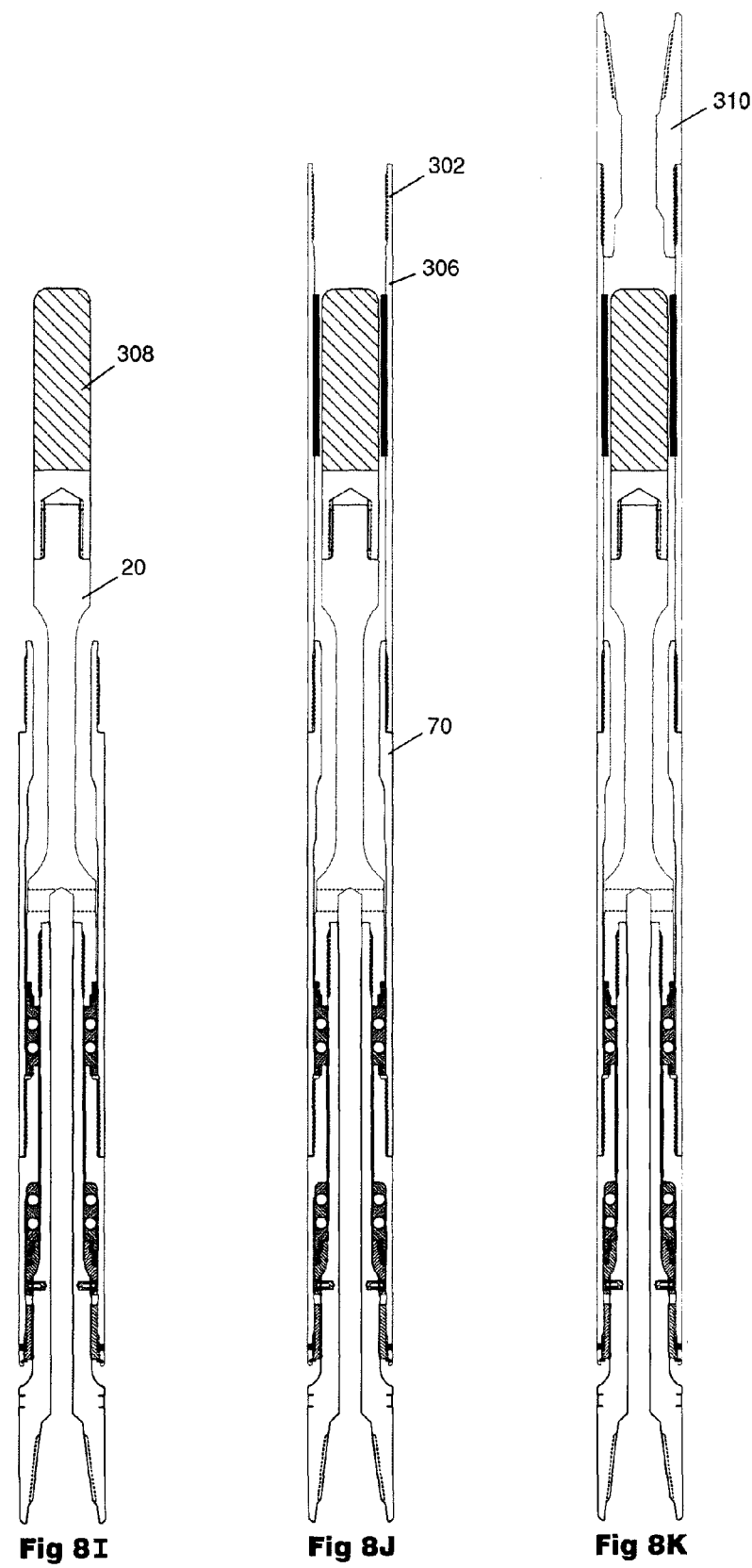

Referring to both FIGS. 1 and 6, in operation, drilling fluid 350 (also known in the art as drilling mud) is pumped down the interior of a drill string attached to downhole drilling motor 301. Drilling fluid 350 enters the drilling motor 301 having a pressure that is a combination of pressure imposed on the drilling fluid by pumps at the surface and the hydrostatic pressure of the above column of drilling fluid 350. The pressurized fluid entering a cavity in the motor, in cooperation with the lobes of the stator 306 and the geometry of the stator 306 and rotor 308 causes the lobes of the stator to deform and the rotor to turn to allow the drilling fluid 350 to pass through the motor 301. Drilling fluid 350 subsequently exits through ports (referred to in the art as jets) in drill bit 370 and travels up the annulus 362 between the bit 370, the assembly 100 of the present invention and the downhole motor assembly 301 and drill string 310 and is received at the surface 348 where it is captured and pumped down the drill string 310 again.

Referring to FIGS. 3 through 5D, therein is illustrated one embodiment of a downhole housing, mandrel and bearing assembly 100 of the present invention. The assembly has a flex shaft 20 with an upper end 21 adapted to connect to a downhole motor power output 309. The flex shaft has a lower portion 27 with a longitudinal cavity 23, at least a portion of said cavity having female threads 24 and a lower end 25 having a male hex connector 26. It will be understood that other forms of connectors such as spline connectors, pins and threaded connectors may be used.

The assembly further includes a tubular mandrel 30 adapted at a lower end 31 to connect to a drill bit. The outer surface of the mandrel is generally cylindrical (except as noted herein) with an outer diameter that is smaller than the inner diameter of an upper housing 70 and a lower housing 60, allowing the mandrel to rotate in the housings. The mandrel has an upper portion 33 with an outer surface containing male threads 34 adapted to connect to the female threads 24 of the lower portion 27 of the flex shaft 20. The mandrel includes a longitudinal passage 32 through the mandrel from an upper end 35 to the lower end 31. A shoulder 37 is disposed between the upper portion 33 having a first outside diameter d1 and a lower portion 36 having a second outside diameter d2, wherein the second outside diameter d2 is greater than the first outside diameter d1. A series of flats (see FIGS. 5 and 5B) are disposed on the outer surface in the lower portion 36 of the mandrel 30 to form a male hex connector 38 upon which a catch assembly 110 is positioned. It will be understood that the series of flats may be six as in a hex connector or may be 2 or more flats that are sized and configured to mate with an interior surface of the catch assembly 110 and connect the mandrel to the catch assembly such that the catch assembly rotates with the mandrel during drilling operations, and does not rotate about the mandrel. It will be understood that other forms of connectors such as spline connectors, pins and threaded connectors may be used.

The assembly further includes a lower tubular housing 60 having a longitudinal passage 66 from an upper end 61 of the housing to a lower end 63 of the housing. The lower tubular housing includes an upper portion 65 having male threads 68 disposed on at least a portion of an external surface. A shoulder 67 is disposed between the upper portion 65 having a first inside diameter d3 and a lower portion 69 having a second inside diameter d4 wherein the second outside diameter d4 is greater than the first outside diameter d3. The upper end 61 further includes a male hex connector 62. It will be understood that the male connector may include a series of 6 flats as in a hex connection or may include two or more flats wherein the flats are configured to mate with a female connector of a bearing race member 87 to be joined to the male connector 62. It will be understood that other forms of connectors such as spline connectors, pins, and threaded connectors may be used.

The assembly further includes an upper tubular housing 70 having: a longitudinal passage 76 from an upper end 71 of the housing to a lower end 73 of the housing. The passage has a lower portion 74 with an internal diameter adapted to receive an upper bearing assembly 80. The lower portion 74 of the internal passage 76 has female threads 75 disposed on at least a portion of an internal surface of the internal passageway, said threads adapted to connect to the male threads 68 of the upper portion of the lower tubular housing 60. The upper housing further includes an upper portion 77 adapted to connect to a stator 302 of a downhole drilling motor 301.

The assembly 100 further includes an upper bearing assembly 80 (see FIGS. 4 and 5) disposed in the internal passageway 76 of the upper housing 70, wherein the upper bearing assembly has at least three bearing race members each having a generally cylindrical body. An upper end race member 82 has an upper end having an upper female hex box connector 83 (see FIGS. 4C and 4D) adapted to receive the male hex connector 26 of the flex shaft 20 (see FIGS. 4A and 4B). The hex connector secures the upper race 82 to the flex shaft such that the upper race rotates with the flex shaft and with the mandrel 30 as the flex shaft and mandrel are rotated in drilling operations. It will be understood that other forms of connectors such as spline connectors, pins and threaded connectors may be used. A middle race member 86 is disposed below the upper race member 82 and separated by a plurality of thrust balls 85. The middle race section 86 is free to rotate with and about the mandrel during drilling operations. A lower end race member 87 is disposed below the middle race member 86. The lower race member has a lower end that includes a lower female hex box connector 89 that secures the lower race member to the male hex connector 62 at the upper end 61 of the lower tubular housing 60 (see FIGS. 4E and 4F). It will be understood that other forms of connectors such as spline connectors, pins and threaded connectors may be used. Therefore, the lower end race member 87 is fixed to the lower housing 60 and does not rotate with the mandrel 30. A plurality of thrust balls 85 are disposed between the middle race member 86 and the lower race member 87.

The assembly further includes a lower bearing assembly 90 disposed in the internal passageway 66 of the lower housing 60, wherein the bearing assembly has an upper race member 92 that is adapted to be received in shoulder 67 of lower housing 60. Upper race member 92 may rotate with and about the mandrel during rotation of the mandrel during drilling operations. A middle race member 96 is disposed below the upper end race member 92 and separated by a plurality of thrust balls 95 (see FIGS. 5D and 5C). The middle race section 96 is free to rotate with and about the mandrel during drilling operations. A lower end race member 93 is disposed below the middle race member 96. The lower race member has a lower end that includes a lower female hex box connector 94 that secures the lower race member to a male hex connector 116 at the upper end of a catch assembly 110 (see FIGS. 5A and 5B). It will be understood that other forms of connectors such as spline connectors, pins and threaded connectors may be used. Therefore, the lower race member 93 is fixed to the catch assembly 110 and rotates with the mandrel 30. The catch assembly 110 is secured to the mandrel as described later herein. Therefore, the race member 93 rotates with the mandrel. A plurality of thrust balls 85 are disposed between the middle race member 96 and the lower race member 93 (see FIGS. 5C and 5D).

The assembly further includes an upper preload spring assembly 130 disposed in an exterior circumferential recess 29 in the lower portion 27 of the flex shaft 20. The spring assembly has a first resilient member 131 with a first end contacting a ledge 28 in recess 29 and a second end contacting a first end of a spacer member 132; and a second resilient member 133 with a first end contacting a second end of spacer member 132 and a second end contacting the upper end of the upper bearing assembly member 82.

The assembly further includes a lower preload spring assembly 140 disposed in an exterior circumferential recess 119 in catch sleeve 110. The spring assembly has a first resilient member 141 with a first end contacting a ledge 113 in recess 119 and a second end contacting a first end of a spacer member 142; and a second resilient member 143 with a first end contacting a second end of spacer member 142 and a second end contacting the lower end 97 of the lower bearing assembly 90.

The assembly further includes a radial sleeve 120 disposed in the lower end 63 of the lower housing 60. The radial sleeve 120 is locked within the lower housing by vertical dowel pin 124 that maintains the radial sleeve rotating with the lower housing around the mandrel during motor operation. The radial sleeve is held within the housing 60 with the retaining ring 122. This retaining ring 122 serves to hold the radial sleeve within housing 60 and extract the lower mandrel 30 and catch sleeve 110 in the event of a fracture within the upper section of the mandrel (see FIGS. 9A and 9B.

The assembly further includes a catch sleeve 110 having an internal passageway 112 adapted to contact the shoulder 37 of the tubular mandrel. The catch sleeve further includes an exterior surface adapted to be received in longitudinal passageway 66 of lower housing 60, and an upper end 115 having an upper male hex connector 116 adapted to receive the female hex connector 94 of the bearing 90. As illustrated in FIGS. 5, 5A and 5B, the tubular mandrel 30 has a portion of the exterior surface wherein the outer perimeter is configured as a hexagon in the portion of the mandrel on which the catch sleeve 110 is disposed. The catch sleeve passageway has an internal surface wherein the perimeter is configured as a hexagon adapted to mate with the outer surface of the tubular mandrel. It will be understood that other forms of connectors such as spline connectors, pins and threaded connectors may be used. When the catch sleeve 110 is in position the catch sleeve will move with the rotating mandrel during drilling operations, not about the mandrel. The assembly 100 further includes at least two radial receptacles 39 disposed in the lower portion 36 of the tubular mandrel, each of said receptacles is adapted to receive a locking pin 41. The pins secure the catch assembly to the mandrel.

The unique design of the assembly 100 provides many advantages over the prior art designs. For example, if the mandrel 30 were to break above the catch sleeve the mandrel can be removed from the wellbore 360 together with the upper 70 and lower 60 housings using the drill string 310. This configuration is desirable as it prevents the undesirable situation of leaving a portion of broken mandrel 30 and drill bit 370 in the wellbore, which must be retrieved in a difficult operation often referred to in the art as "fishing." Due to the unique configuration of the assembly of the present invention the broken mandrel 30 and drill bit 370 would be pulled from the wellbore using the drill string. Because of the configuration of the catch sleeve 110, the mandrel 30 and lower housing 60, the mandrel will not fall out of the lower housing 60 and be left in the wellbore 360.

Referring now to FIG. 7A, wherein there is illustrated the transfer of downward force DF through the assembly 100 to the bit 370 during drilling operations. Downward force DF is transmitted through the upper housing 70 and lower housing 60 through the lower bearing 90 and catch sleeve 110 to the shoulder 37 of the mandrel 30 and through the mandrel to the bit 370. When pulling the drill string 310 from the hole, removal force RF is transferred through the upper bearing 80 to the flex shaft 20 which is connected to the mandrel 30 and through the mandrel 30 to the bit 370 (see FIG. 7B).

FIGS. 8A to 8K are partial cross-sections illustrating the sequential steps of assembling the housing, mandrel and bearing assembly of FIG. 3. In step 1, the mandrel 30, as illustrated in FIGS. 3, 4 and 5, and described above, is provided. A retaining ring 122 is slid downward from the top of the mandrel 30 until it rests on an outer radius of the bit box (See FIG. 8A).

In step 2, a radial sleeve 120 is slid over the mandrel from the top until it rests on the retaining ring (see FIG. 8A).

In step 3 (see FIG. 8B), a catch sleeve 110 is slid over the top of the mandrel until the lower female hex connector is positioned over the male hex connector of the mandrel and the catch sleeve abuts the shoulder 37 of the mandrel.

In step 4 (see FIG. 8B), locking pins 41 are inserted into receptacles 39 in mandrel 30 to secure the catch sleeve to the mandrel.

In step 5 (see FIG. 8C), one or more lower preload spring assemblies 140 are inserted onto the catch sleeve and positioned in recess 119 of the catch assembly 110.

In step 6 (see FIG. 8D), lower bearing assembly 90 is slid over the mandrel and positioned on the top of catch sleeve 110.

In step 7 (see FIG. 8E), lower housing 60 is slid over the mandrel and positioned such that a ledge contacts the upper end of the lower bearing assembly. Retaining ring 122 is inserted into the lower end of the lower housing. The retaining ring 122 keeps the radial sleeve 120 from falling out the lower end of the housing 60.

In step 8 (see FIG. 8F), upper bearing assembly 80 is slid over the mandrel and positioned with the lower female hex connector of the bearing assembly onto the upper male hex connector of the lower housing.

In step 9 (see FIG. 8G), preload spring assembly 130 is slid over the mandrel and positioned adjacent the bearing assembly 80 to bias the bearing assembly members together and in contact with the housing 60.

In step 10 (see FIG. 8G), flex shaft 20 is positioned over the upper end of the mandrel and threadedly connected to the upper end of the mandrel.

In step 11 (see FIG. 8H), upper housing 70 is positioned over the flex shaft 20 and threadedly connected to lower housing 60.

In step 12 (see FIG. 8I), the power output 309 and rotor 308 of downhole motor 301 is connected to the flex shaft 20.

In step 13 (see FIG. 8J), the stator 306 and motor housing 302 is positioned over the rotor and upper end of the flex shaft.

In step 14 (see FIG. 8K), the upper end of motor housing 302 is connected to a cross-over sub that is connected to drill string 310.

Figure 10:
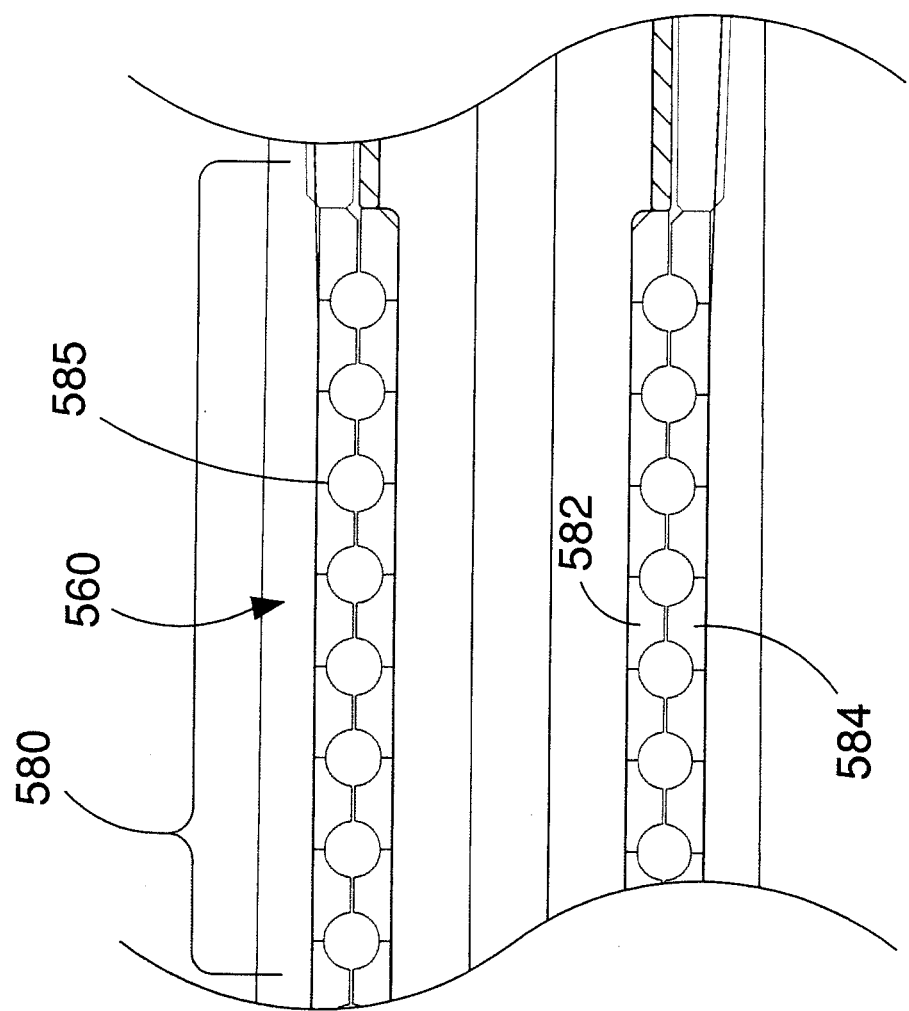
FIG. 10 is a cross-section of a prior art bearing used in a downhole motor.
Figure 11:
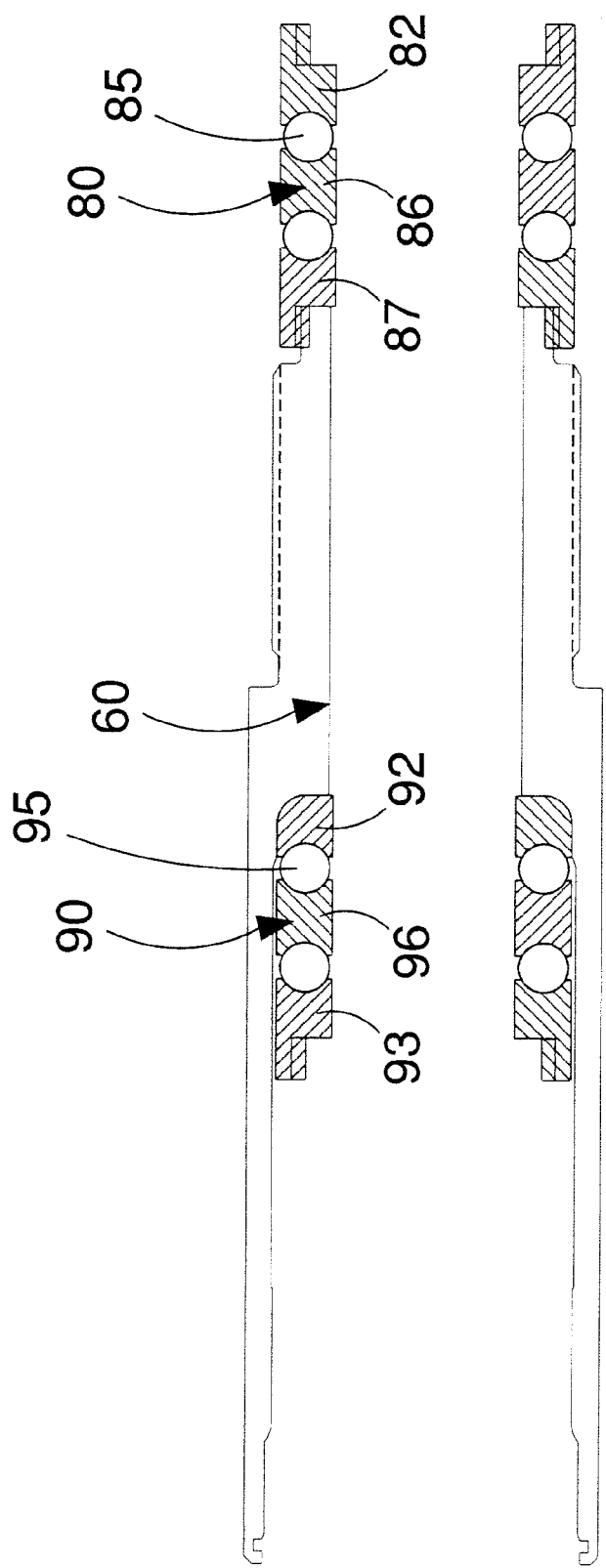
FIG. 11 is a cross-section of the upper housing and the upper and the lower bearing assemblies of the assembly of FIG. 3.

Referring to FIG. 10, wherein is illustrated a cross-section of a prior art bearing system 580 inside housing 560. The bearing races are formed from an inside member 582 and an outside member 584. This assembly requires more machining and assembly time than the bearing assemblies 80 and 90 of the present invention (see FIG. 11). Bearing assemblies 80 and 90 are separated by housing 60.

Bearing races 82, 86, 87, 92, 96, 93 are a single construction saving time and money in manufacturing an assembly when compared to prior art assembly 560.

It will be understood that threaded and hex connectors have been disclosed and described in the drawings and specifications; the present invention may use various types of connectors.

A number of embodiments of the invention have been described. Nevertheless, it will be understood that various modifications may be made without departing from the spirit and scope of the invention.

What is claimed is:

1. A downhole housing, mandrel and bearing assembly comprising:
   a flex shaft having:
      an upper end adapted to receive rotational torque power from a downhole motor power output,
      a lower portion with a longitudinal cavity, at least a portion of said cavity having threads,
      a lower end having a connector;
   a tubular mandrel adapted at a lower end to connect to a drill bit, said tubular mandrel having:
      an upper portion of the tubular mandrel with an external surface containing threads adapted to connect to the threads in the longitudinal cavity of the flex shaft,
      a longitudinal passage through the tubular mandrel from an upper end to the lower end,
      a shoulder disposed on a portion of the external surface of the tubular mandrel between the upper portion of the tubular mandrel and a lower portion of the tubular mandrel, said upper portion having a first outside diameter d1 and said lower portion having a second outside diameter d2, wherein the second outside diameter d2 is greater than the first outside diameter d1;
   a lower tubular housing having:
      a longitudinal passage from an upper end of the housing to a lower end of the housing,
      an upper portion having threads disposed on at least a portion of an external surface,
      a shoulder disposed between the upper portion of the housing and a lower portion of the housing, said upper portion having a first inside diameter d3 and said lower portion having a second inside diameter d4, wherein the second inside diameter d4 is greater than the first inside diameter d3;
   an upper tubular housing having:
      a longitudinal passage from an upper end of the housing to a lower end of the housing,
      said longitudinal passage having a lower portion with an internal diameter adapted to receive an upper bearing assembly,
      said lower portion of the longitudinal passage adapted to connect to the threads on the upper portion of the lower tubular housing;
   an upper bearing assembly disposed in the longitudinal passage of the upper tubular housing, said bearing assembly having at least an upper race member, a middle race member disposed below the upper race member and separated from the upper race member by a plurality of thrust balls, and a lower race member disposed below the middle race member and separated from the middle race member by a plurality of thrust balls; and
   a lower bearing assembly disposed in the longitudinal passage of the lower tubular housing, said bearing assembly having at least an upper race member that is adapted to be received in the shoulder of the lower housing, a middle race member disposed below the upper race member and separated from the upper race member by a plurality of thrust balls, and a lower end race member disposed below the middle race member and separated from the middle race member by a plurality of thrust balls.

2. The assembly of claim 1 further including: an upper preload spring assembly disposed in an exterior circumferential recess in the lower portion of the flex shaft, said spring assembly comprising:
   a first resilient member with a first end contacting a ledge in the recess and a second end contacting a first end of a spacer member; and
   a second resilient member with a first end contacting a second end of the spacer member and a second end contacting an upper end of the upper bearing assembly.

3. The assembly of claim 1 further including:
   a lower preload spring assembly disposed in an exterior circumferential recess in a tubular catch sleeve, said spring assembly comprising:

a first resilient member with a first end contacting a ledge in the recess and a second end contacting a first end of a spacer member; and a second resilient member with a first end contacting a second end of the spacer member and a second end contacting a lower end of the lower bearing assembly.

4. The assembly of claim 1 further including:
a tubular catch sleeve disposed on a lower portion of the tubular mandrel, said tubular catch sleeve having:
an internal passageway in the tubular catch sleeve adapted to contact the shoulder of the tubular mandrel;
an exterior surface adapted to be received in the longitudinal passage of the lower tubular housing;
an upper end having a connector adapted to connect to the lower bearing assembly;
a portion of the internal passageway having at least two flats adapted to mate to at least two flats on a portion of the tubular mandrel.

5. The assembly of claim 4 wherein there are six flats in the internal passageway forming a female hex connector and there are six flats on a portion of the tubular mandrel that form a male hex connector.

6. The assembly of claim 4 further including:
at least two radial receptacles disposed in the lower portion of the tubular mandrel, each of said receptacles adapted to receive a locking pin adapted to secure the tubular catch sleeve to the tubular mandrel.

7. The assembly of claim 4 further including:
a radial sleeve disposed in the lower end of the lower housing, said radial sleeve adapted to retain the tubular catch sleeve inside the lower housing.

8. The upper bearing assembly of claim 1 wherein the upper race member has an upper end having a connector adapted to connect to the flex shaft thereby securing the upper race to the flex shaft such that the upper race member rotates with the flex shaft and with the tubular mandrel as the flex shaft and tubular mandrel are rotated in drilling operations.

9. The upper bearing assembly of claim 1 wherein the middle race member is free to rotate with and about the tubular mandrel during drilling operations.

10. The upper bearing assembly of claim 1 wherein the lower race member has a lower end that includes a connector that secures the lower race member to a connector at an upper end of the lower tubular housing.

11. The assembly of claim 4 wherein the lower race member of the lower bearing assembly has a lower end that includes a connector that secures the lower race member to the connector at the upper end of the tubular catch sleeve, thereby securing the lower race member of the lower bearing assembly to the tubular catch sleeve, and wherein the tubular catch sleeve is secured to the tubular mandrel.

12. The assembly of claim 1 wherein each bearing member is a single unitary piece.

13. A downhole bearing and housing assembly comprising:
a lower tubular housing having:
a longitudinal passage from an upper end of the housing to a lower end of the housing,
an upper portion having threads disposed on at least a portion of an external surface,
a shoulder disposed between the upper portion of the housing and a lower portion of the housing, said upper portion having a first inside diameter d3 and said lower portion having a second inside diameter d4, wherein the second inside diameter d4 is greater than the first inside diameter d3;

an upper tubular housing having:
a longitudinal passage from an upper end of the housing to a lower end of the housing,
said longitudinal passage having a lower portion with an internal diameter adapted to receive an upper bearing assembly,
said lower portion of the longitudinal passage having threads disposed on at least a portion of an internal surface of the longitudinal passage, said threads adapted to connect to the threads of the upper portion of the lower tubular housing;
an upper bearing assembly disposed in the longitudinal passage of the upper tubular housing, said bearing assembly having an upper race member, a middle race member disposed below the upper race member and separated from the upper race member by a plurality of thrust balls, and a lower race member disposed below the middle race member and separated from the middle race member by a plurality of thrust balls; and
a lower bearing assembly disposed in the longitudinal passage of the lower tubular housing, said bearing assembly having an upper race member that is adapted to be received in the shoulder of the lower housing, a middle race member disposed below the upper race member and separated from the upper race member by a plurality of thrust balls, and a lower end race member disposed below the middle race member and separated from the middle race member by a plurality of thrust balls.

14. The upper bearing assembly of claim 13 wherein the upper race member has an upper end having a connector adapted to connect to a rotatable flex shaft said flex shaft being connectable to a source of rotational torque, wherein when the upper race is connected to the flex shaft, the upper race member rotates with the flex shaft and with a tubular mandrel as the flex shaft and tubular mandrel are rotated in drilling operations.

15. The upper bearing assembly of claim 13 wherein the middle race member is free to rotate with and about a tubular mandrel during drilling operations.

16. The upper bearing assembly of claim 13 wherein the lower race member has a lower end that includes a connector that secures the lower race member to a connector at an upper end of the lower tubular housing.

17. The lower bearing assembly of claim 13 wherein the lower race member has a lower end that includes a connector that secures the lower race member to a connector at an upper end of a tubular catch sleeve, thereby securing the lower race member to the tubular catch sleeve, and wherein the tubular catch sleeve is secured to a tubular mandrel.

18. The assembly of claim 13 wherein each bearing member is a single unitary piece.

19. A method of assembling a downhole drilling assembly comprising the steps of:
providing a tubular mandrel having a bit box at a lower end adapted to connect to a drill bit, said tubular mandrel having an upper portion of the tubular mandrel having an external surface adapted to connect a rotatable flex shaft to a source of rotational torque, a shoulder disposed on a portion of the external surface of the tubular mandrel between the upper portion of the tubular mandrel and a lower portion of the tubular mandrel,
sliding a retaining ring downwardly from an upper end of the tubular mandrel until the retaining ring rests on an outer radius of the bit box at the lower end of the tubular mandrel;

sliding a radial sleeve over the tubular mandrel from the upper end until the radial sleeve rests on the retaining ring;

sliding a tubular catch sleeve over the upper end of the tubular mandrel until a lower female hex connector disposed in an internal passageway through the tubular catch sleeve is positioned over a male hex connector of the tubular mandrel and an interior surface of the internal passageway of the tubular catch sleeve abuts the shoulder of the tubular mandrel;

inserting locking pins into receptacles in the tubular mandrel to secure the tubular catch sleeve to the tubular mandrel;

sliding a lower bearing assembly over the tubular mandrel and positioning the bearing assembly on a top of the tubular catch sleeve;

sliding a lower tubular housing over the tubular mandrel and positioning the lower housing such that a ledge of the lower housing contacts an upper end of the lower bearing assembly;

inserting a retaining ring into the lower end of the lower housing;

sliding an upper bearing assembly over the tubular mandrel and positioning the bearing assembly with a lower female hex connector of the bearing assembly onto an upper male hex connector of the lower housing;

positioning a tubular flex shaft over the upper end of the tubular mandrel and threadedly connecting the flex shaft to the upper end of the tubular mandrel; and positioning an upper tubular housing over the flex shaft and threadedly connecting the upper tubular housing to the lower tubular housing.

20. The method of claim 19 further including the steps of:
connecting a power output of a downhole motor to an upper end of the rotatable flex shaft; and
positioning a stator and motor housing of the downhole motor over the upper end of the flex shaft.

21. The method of claim 20 further including connecting an upper end of the motor housing to a cross-over sub that is connected to a drill string.

\* \* \* \* \*